United States Patent
Castillo et al.

(10) Patent No.: US 12,163,093 B2
(45) Date of Patent: Dec. 10, 2024

(54) CHELATING AGENTS FOR BARIUM SULFATE DISSOLUTION IN DISPLACMENT SPACER SYSTEMS

(71) Applicant: Baker Hughes Oilfield Operations LLC, Houston, TX (US)

(72) Inventors: Dorianne A. Castillo, Humble, TX (US); Sebastian Mesa, Bogota (CO)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 18/189,383

(22) Filed: Mar. 24, 2023

(65) Prior Publication Data
US 2024/0318061 A1 Sep. 26, 2024

(51) Int. Cl.
*C09K 8/528* (2006.01)
*C09K 8/40* (2006.01)

(52) U.S. Cl.
CPC .............. *C09K 8/40* (2013.01); *C09K 8/528* (2013.01)

(58) Field of Classification Search
None
See application file for complete search history.

(56) References Cited

U.S. PATENT DOCUMENTS

| | | | | |
|---|---|---|---|---|
| 4,030,548 | A * | 6/1977 | Richardson | C02F 5/08 210/698 |
| 4,083,407 | A * | 4/1978 | Griffin, Jr | C09K 8/40 507/216 |
| 5,032,280 | A | 7/1991 | Paul et al. | |
| 5,183,112 | A | 2/1993 | Paul et al. | |
| 6,063,737 | A * | 5/2000 | Haberman | C09K 8/424 166/291 |
| 7,681,644 | B2 | 3/2010 | Montgomery et al. | |
| 8,091,645 | B2 | 1/2012 | Quintero et al. | |
| 9,512,348 | B2 | 12/2016 | Reyes et al. | |
| 2004/0182577 | A1 | 9/2004 | Chatterji et al. | |
| 2006/0073986 | A1 * | 4/2006 | Jones | C09K 8/52 507/129 |
| 2012/0252705 | A1 * | 10/2012 | Sarap | C09K 8/40 507/131 |
| 2013/0303412 | A1 * | 11/2013 | Luyster | C09K 8/86 507/236 |
| 2017/0081581 | A1 | 3/2017 | Al-Subhi et al. | |
| 2019/0071597 | A1 | 3/2019 | Purdy et al. | |
| 2020/0231861 | A1 * | 7/2020 | Iremonger | C09K 8/52 |
| 2020/0308472 | A1 | 10/2020 | Purdy et al. | |

FOREIGN PATENT DOCUMENTS

WO 9011972 A1 10/1990

OTHER PUBLICATIONS

Dunn, Kai et al., "Dissolution of Barium Sulfate Scale Deposits by Chelating Agents;" Environmental Science & Technology, vol. 33, No. 16; Jun. 8, 1999; 4 pages.
Gamal, Hany et al., "Barium Sulfate Scale Removal at Low-Temperature;" Wiley Hindawi, Geofluids, vol. 2021; Article ID: 5527818; Mar. 23, 2021; 12 pages.
Shende, Aniket; "Dissolution of Barite Scale Using Chelating Agents;" Office of Gradute Studies of Texas A&M University; May 2012; 68 pages.
International Search Report & Written Opinion in International Application No. PCT/US2024/018607, mailed Jun. 28, 2024; 9 pages.

* cited by examiner

*Primary Examiner* — Andrew Sue-Ako
(74) *Attorney, Agent, or Firm* — CANTOR COLBURN LLP

(57) ABSTRACT

A method includes: injecting a first spacer fluid into a wellbore that comprises a drilling fluid, the first spacer fluid containing barium sulfate and a first spacer fluid carrier; and injecting into the wellbore a second spacer fluid containing a chelating agent and a second spacer fluid carrier. A spacer fluid system includes: a first spacer fluid containing barium sulfate and a first spacer fluid carrier; and a second spacer fluid containing about 10% to about 30 wt % of a chelating agent based on a total weight of the second spacer fluid, and a second spacer fluid carrier.

16 Claims, No Drawings

CHELATING AGENTS FOR BARIUM SULFATE DISSOLUTION IN DISPLACMENT SPACER SYSTEMS

BACKGROUND

This disclosure relates to spacer systems and methods of using the spacer systems in wellbores.

Drilling fluids (or "muds") used in the drilling of subterranean oil and gas wells and other drilling applications are well known. Drilling fluids carry cuttings and other particulates from beneath the bit, transport them through the annulus, and allow their separation at the surface while at the same time the rotary bit is cooled and cleaned. A drilling fluid is also intended to reduce friction between the drill string and the sides of the hole while maintaining the stability of uncased sections of the borehole. The drilling fluid is formulated to prevent unwanted influxes of formation fluids from permeable rocks penetrated. The drilling fluid may also be used to collect and interpret information available from drill cuttings, cores and electrical logs. It will be appreciated that as used herein, the term "drilling fluid" also encompasses "drill-in fluids" and "completion fluids".

A spacer fluid, in contrast, is a liquid used to physically separate one special-purpose liquid from another. A cement spacer fluid separates a drilling fluid from a cement slurry during cementing operations in a wellbore. A cement spacer fluid can also clean up the wellbore. Prior art cement spacer fluids include microemulsions that contain various surfactants. While these emulsions can displace drilling muds from the wellbore, some microemulsions have certain drawbacks, for example, instability under operating conditions, especially at the higher temperatures as they can exist at the bottom of a wellbore. Certain surfactants' ability to clean the wellbore can also decrease at higher wellbore temperatures. Usually these disadvantages affect the quality of the cementing operation in the drill hole, for example, by failing to adequately remove the drilling fluid, the performance of the set cement slurry may be compromised with respect to its ability to bond to both the exposed rock surface in the drilled wellbore and to the tubulars placed in the wellbore. Accordingly, there remains a need in the art for improved spacer fluids that overcome aforementioned drawbacks. In particular, a need remains for a cement spacer fluid that can effectively remove particulates such as drilling muds, as well as liquid contaminant from the wellbore.

BRIEF DESCRIPTION

A method includes: injecting a first spacer fluid into a wellbore that comprises a drilling fluid, the first spacer fluid comprising barium sulfate and a first spacer fluid carrier; and injecting into the wellbore a second spacer fluid comprising a chelating agent and a second spacer fluid carrier.

A spacer fluid system includes: a first spacer fluid comprising barium sulfate and a first spacer fluid carrier; and a second spacer fluid comprising about 10% to about 30 wt % of a chelating agent based on a total weight of the second spacer fluid, and a second spacer fluid carrier, wherein the first spacer fluid carrier and the second spacer fluid carrier independently comprises water or a brine; and wherein the chelating agent in the second spacer fluid comprises at least one of ethylenediaminetetraacetic acid or a salt thereof, (N,N-dicarboxymethyl glutamic) acid or a salt thereof, aspartic acid N,N-diacetic acid or a salt thereof, methylglycine N,N-diacetic acid or a salt thereof, etidronic acid or a salt thereof, diethylenetriamine pentaacetate or a salt thereof, hydroxyethylethylenediaminetriacetic acid or a salt thereof; N-(2-hydroxyethyl)iminodiacetic acid or a salt thereof, ethylenediamine-N, N'-disuccinic acid or a salt thereof, egtazic acid or a salt thereof, nitrilotriacetic acid or salt thereof, or cyclohexanediaminetetraacetic acid or a salt thereof.

DETAILED DESCRIPTION

A detailed description of one or more embodiments is presented herein by way of exemplification and not limitation.

An improved method uses a spacer fluid system comprising a first spacer fluid comprising barium sulfate and a second spacer fluid comprising a chelating agent (collectively "spacer fluids" or "spacers"). Unlike the current spacers based on microemulsions, the instant spacer fluid system can be used at higher temperatures without unpleasant odors associated with the use of glycoside. In addition, the chelating agent is effective to dissolve and remove barium sulfate and other solids left in the wellbore after a drilling operation.

The method comprises injecting a first spacer fluid into a wellbore that comprises a drilling fluid, the first spacer fluid comprising barium sulfate and a first spacer fluid carrier; and injecting into the wellbore a second spacer fluid comprising a chelating agent and a second spacer fluid carrier.

The drilling fluid can be displaced with at least one of the first spacer fluid or the second spacer fluid. Displacing the drilling fluid includes displacing a contaminant particulate present in the wellbore. The contaminant particulate comprises at least one of a drilling fluid particulate, drilling cutting, or a reservoir rock particulate such as a shale particulate, mudstone particulate, sandstone particulate, or carbonate particulate.

In use, at least a portion of the barium sulfate from the first spacer fluid can settle out and deposit on a wall of the wellbore, an apparatus in the wellbore, or a combination thereof. Advantageously, the deposited barium sulfate can dissolve in the second spacer fluid. Thus the deposited barium sulfate can be taken out of the wellbore together with the second spacer fluid, avoiding any potential contaminations caused by the deposited barium sulfate.

As used herein, the first spacer fluid carrier and the second spacer fluid carrier are independently present in the respective first and second spacer fluids in an amount of about 10% to about 98% by weight, more preferably in an amount of about 20% to about 98% by weight, or 60% to 98 wt % based on the total weight of the respective first and second spacer fluids.

The first spacer fluid carrier and the second spacer fluid carrier can independently be fresh water, or a brine.

The brine can be, for example, seawater, produced water, completion brine, or a combination comprising at least one of the foregoing. The properties of the brine can depend on the identity and components of the brine. Seawater, for example, can contain numerous constituents including sulfate, bromine, and trace metals, beyond typical halide-containing salts. Produced water can be water extracted from a production reservoir (e.g., hydrocarbon reservoir) or produced from an underground reservoir source of fresh water or brackish water. Produced water can also be referred to as reservoir brine and contain components including barium, strontium, and heavy metals. In addition to naturally occurring brines (e.g., seawater and produced water), completion brine can be synthesized from fresh water by addition of various salts for example, KCl, NaCl, $ZnCl_2$, $MgCl_2$, or CaCl$_2$ to increase the density of the brine. Completion brines typically provide a hydrostatic pressure optimized to counter the reservoir pressures downhole. The above brines can be modified to include one or more additional salts. The additional salts included in the brine can be at least one of NaCl, KCl, NaBr, MgCl$_2$, CaCl$_2$, CaBr$_2$, ZnBr2, NH$_4$Cl, sodium formate, or cesium formate. The NaCl salt can be present in the brine in an amount of about 0.5 to about 25 weight percent (wt. %), specifically about 1 to about 15 wt. %, and more specifically about 3 to about 10 wt %, based on the weight of the brine.

Examples of the chelating agents in the second spacer fluid include, but are not limited to, ethylenediaminetetraacetic acid (EDTA) or a salt thereof such as sodium EDTA, disodium EDTA, diammonium EDTA, or tetraammonium EDTA; (N,N-ddicarboxymefhil glutamic) acid (GLDA) or a salt thereof; aspartic acid N,N-diacetic acid (ASDA) or a salt thereof; methylglycine N,N-diacetic acid (MGDA) or a salt thereof such as trisodium dicarboxymethyl alaninate; etidronic acid (also referred to 1-hydroxyethane-1,1-diphosphonic acid or HEDP) or a salt thereof; diethylenetriamine pentaacetate (DTPA) or a salt thereof such as pentasodium diethylene-triaminepentaacetate; hydroxyethylethylenediaminetriacetic acid (HEDTA) or a salt thereof such as trisodium N-(hydroxyethyl)-ethylenediaminetriacetate; N-(2-hydroxyethyl)iminodiacetic acid (HEIDA) or a salt thereof; ethylenediamine-N, N'-disuccinic acid (EDDS) or a salt thereof; egtazic acid (EGTA) or a salt thereof; nitrilotriacetic acid (NTA) or salt thereof; cyclohexanediaminetetraacetic acid (CDTA) or a salt thereof; or a combination comprising at least one of the foregoing. Preferably the chelating agent is EDTA or a salt thereof.

The chelating agent can be present in an amount of about 1% to about 50%, preferably about 20% to about 50%, each based on a total weight of the second spacer fluid.

The first spacer fluid, the second spacer fluid, or both can further comprise other components known for use in spacer fluids, for example a viscosifier, a viscosifier crosslinker, a pH control agent, a surfactant, a weighting agent, a lubricant, a fluid loss agent, a clay stabilizer, a biocide, an acid, a corrosion inhibitor, a friction reducer, an oxygen scavenger, a formation fines controller, a foamer, a gel stabilizer, or a combination comprising at least one of the foregoing. These additional components are selected so as to avoid imparting unfavorable characteristics to the spacer fluids, to avoid damage to equipment in contact with the spacer fluids, and to avoid damaging the wellbore or subterranean formation. Each additive can be present in amounts generally known to those of skill in the art.

The viscosifier can be a natural polymers such as guar gums, guar derivatives such as hydropropyl guar (HPG), carboxymethyl guar (CMG), and carboxymethylhydroxypropyl guar (CMHPG), high-molecular weight, hydratable polysaccharides, xanthan gum (which can optionally be crosslinked), galactomannan gums, glucomannan gums, cellulose, cellulose derivatives such as hydroxyethylcellulose (HEC), carboxymethylcellulose (CMC), hydroxypropylcellulose (HPC), and carboxymethylhydroxyethylcellulose (CMHEC); synthetic polymers such as poly((meth)acrylic acid)s, poly((meth)acrylamides), copolymers of (meth) acrylic acid and (meth)acrylamide, and C1-8 alkyl poly (meth)acrylates; or clays such as bentonite, sepiolite, and attapulgite, and the like; or a combination comprising at least one of the foregoing viscosifiers.

A crosslinker for the viscosifier can be present, for example a borate, titanate, zirconate, aluminate, or chromate crosslinker, or a combination comprising at least one of the foregoing.

The pH-adjusting agent can be an organic or inorganic base, organic or inorganic acid, or a buffer, which is any appropriate combination of acid and conjugate base. Examples of inorganic bases include those represented by MOH, where M is a metal from group 1 or 2 of the periodic table, a transition metal, or a metal or metalloid from group 13, 14, or 15; carbonate salt; bicarbonate salt; or a combination comprising at least one of the foregoing. Examples of inorganic acids include HCl, HBr, fluoroboric acid, sulfuric acid, nitric acid, acetic acid, formic acid, methanesulfonic acid, propionic acid, chloroacetic or dichloroacetic acid, citric acid, glycolic acid, lactic acid, or a combination comprising at least one of the foregoing. Specific examples of pH control agents, particularly those used in combination with borate crosslinking agents include alkaline metal and alkaline earth metal hydroxides and carbonates such as sodium hydroxide and sodium carbonate, metal oxides such as magnesium oxide, sodium sesquicarbonate, and amines such as hydroxyalkyl amines, anilines, pyridines, pyrimidines, quinolines, and pyrrolidines, and carboxylates such as acetates and oxalates.

Surfactants can increase the compatibility of the spacer fluid and the drilling fluid and/or cement slurry. The surfactant can be anionic, cationic, zwitterionic, or non-ionic. Other useful surfactants include those having poly(alkylene glycol) side chains, fatty acids, or fluorinated groups such as perfluorinated C$_{1-4}$ sulfonic acids grafted to the polymer backbone. Polymer backbones include those based on a polyester, a poly(meth)acrylate, a polystyrene, a poly(styrene-(meth)acrylate), a polycarbonate, a polyamide, a polyimide, a polyurethane, a polyvinyl alcohol, or a copolymer comprising at least one of these polymeric backbones.

Weighting agents are high-specific gravity and finely divided solid materials used to increase density. The barium sulfate can be the only weighting agents present in the first spacer fluid and/or the second spacer fluid. Alternatively, the barium sulfate can be used together with other weighting agents such as silica flour, fly ash, calcium carbonate, hematite, ilmenite, siderite, and the like.

Lubricants minimize friction and include materials such as a polyacrylamide, petroleum distillate, hydrotreated light petroleum distillate, a short chain alcohol (e.g., methanol), or polyol (e.g., ethylene glycol or glycerol polyisobutyl methacrylate, polymethyl methacrylate, polyisobutylene, guar, guar derivatives, a polysaccharide such as cellulose and starch, and polyethylene oxide, or a combination comprising at least one of the foregoing can be used.

Fluid-loss control agents are usually water-soluble polymers such as guar gums, poly(ethyleneimine, cellulose derivatives, and polystyrene sulfonate. In some embodiments the same polymer functions as both a viscosifier and a fluid-loss control agent.

A biocide prevents injection of a microbe (e.g., bacteria) downhole by eliminating or reducing bacteria in the spacer fluid, thus reducing production of, e.g., sour gas. Optionally, the biocide is encapsulated or coated.

The various properties of the spacer fluids can be varied and adjusted according to well control and compatibility parameters of the particular drilling fluid, cement slurry, or other fluid being segregated. For example, the viscosity of the first and second spacer fluids can be varied over a wide range such as an apparent viscosity (AV) from about 0.9 to about 200 centiPoise (cP).

The density of the first and second spacer fluids can vary over a wide range. In an embodiment, the first spacer fluid is heavier (denser) than the preceding fluid (drilling fluid), and lighter than the second spacer fluid (e.g., a 12 ppg drilling fluid and then a 14 ppg first spacer fluid and then a 16 ppg second spacer fluid and then 18 ppg cement slurry).

In an aspect, the first spacer fluid has a density that is about 2 ppg higher than a density of the drilling fluid. The second spacer fluid has a yield point that is about 1.5 times higher than a yield point of the drilling fluid.

The first and second spacer fluid can each independently be premixed or is injected without mixing, e.g., injected "on the fly" where the components are combined as the spacer fluids are being injected downhole. The order of addition can be varied and the time of injecting each is the same or different.

The drilling fluid can be oil based drilling fluids or water based drilling fluids. In oil based fluids, solid particles are suspended in oil, and water or brine may be emulsified with the oil. The oil is typically the continuous phase. In water based fluids, solid particles are suspended in water or brine, and oil may be emulsified in the water. The water is typically the continuous phase.

In general, in a method of cementing a wellbore, the first and second spacer fluids are used to displace the drilling fluids present, and preferably to further remove oil and solids from the well and wellbore surfaces. The method includes injecting, generally pumping, into the wellbore a first spacer fluid and a second spacer fluid at a pressure sufficient to displace the drilling fluid. In a preferred embodiment, the drillings fluids are displaced together with solids such as drilling fluid solids and drill cuttings. A cement slurry is then injected into the wellbore (optionally with a "lead slurry" or a "tail slurry"). The cement slurry can be introduced between a penetrable/rupturable bottom plug and a solid top plug. Once placed, the cement slurry is allowed to harden to form the cement plug in the wellbore annulus, which prevents the flow of reservoir fluids between two or more permeable geologic formations that exist with unequal reservoir pressures. As is known by those of skill in the art, a high degree of variability exists in the above description of well cementation (e.g., multiple bottom plugs, graduated fluid densities, etc.), and can be effected using cement spacer fluid described herein.

Use of the spacer fluids provides a number of benefits. The fluids are stable at high wellbore temperatures, for example up to about 350° F. In some embodiments, the fluids are stable at about 150 to about 350° F., or about 150 to about 250° F. The spacer fluids are compatible with both drilling fluid and the cement slurries that they are used in conjunction with. Additionally, the spacer fluids can more effectively remove drilling muds and contaminant particles from wellbores, for example drilling fluid particulates, drilling cuttings, and particles of reservoir rock sloughed into the drilled wellbore from weak formations, for example a shale particulate, mudstone particulate, sandstone particulate, carbonate particulate, and the like. The spacer fluids can further suppress mixing of drilling fluids and cement slurries when compared to turbulent flow spacer fluids.

The methods and compositions further have the advantages of improved cementing, by reducing the amount of drilling fluids, contaminant particles, and other debris before introducing the cement slurry.

Further included in this disclosure are the following specific embodiments, which do not necessarily limit the claims.

Aspect 1. A method comprising: injecting a first spacer fluid into a wellbore that comprises a drilling fluid, the first spacer fluid comprising barium sulfate and a first spacer fluid carrier; and injecting into the wellbore a second spacer fluid comprising a chelating agent and a second spacer fluid carrier.

Aspect 2. The method as in any prior aspect, further comprising displacing the drilling fluid with at least one of the first spacer fluid or the second spacer fluid.

Aspect 3. The method as in any prior aspect, wherein displacing the drilling fluid further comprises displacing a contaminant particulate present in the wellbore.

Aspect 4. The method of Aspect 3, wherein the contaminant particulate comprises at least one of a drilling fluid particulate, drilling cutting, or a reservoir rock particulate.

Aspect 5. The method as in any prior aspect, wherein at least a portion of the barium sulfate from the first spacer fluid is deposited on a wall of the wellbore, an apparatus in the wellbore, or a combination thereof upon contact with the first spacer fluid.

Aspect 6. The method of aspect 5, further comprising dissolving and removing the deposited barium sulfate with the second spacer fluid.

Aspect 7. The method as in any prior aspect, wherein the first spacer fluid carrier and the second spacer fluid carrier independently comprises water or a brine.

Aspect 8. The method as in any prior aspect, wherein the first spacer fluid, the second spacer fluid, or both independently further comprises at least one of a viscosifier, a viscosifier crosslinker, a pH control agent, a surfactant, a weighting agent, a lubricant, a fluid loss agent, a clay stabilizer, a biocide, an acid, a corrosion inhibitor, a friction reducer, an oxygen scavenger, a formation fines controller, a foamer, or a gel stabilizer.

Aspect 9. The method as in any prior aspect, wherein the first spacer fluid has a density that is about 2 ppg higher than a density of the drilling fluid.

Aspect 10. The method as in any prior aspect, wherein the second spacer fluid has a yield point that is about 1.5 times higher than a yield point of the drilling fluid.

Aspect 11. The method as in any prior aspect, wherein the chelating agent in the second spacer fluid comprises at least one of ethylenediaminetetraacetic acid or a salt thereof, (N,N-dicarboxymethyl glutamic) acid or a salt thereof, aspartic acid N,N-diacetic acid or a salt thereof, methylglycine N,N-diacetic acid or a salt thereof, etidronic acid or a salt thereof, diethylenetriamine pentaacetate or a salt thereof, hydroxyethylethylenediaminetriacetic acid or a salt thereof; N-(2-hydroxyethyl)iminodiacetic acid or a salt thereof, ethylenediamine-N, N'-disuccinic acid or a salt thereof, egtazic acid or a salt thereof, nitrilotriacetic acid or salt thereof, or cyclohexanediaminetetraacetic acid or a salt thereof.

Aspect 12. The method as in any prior aspect, wherein the chelating agent in the second spacer fluid comprises at least one of sodium ethylenediaminetetraacetic acid, disodium ethylenediaminetetraacetic acid, diammonium ethylenediaminetetraacetic acid, or tetraammonium ethylenediaminetetraacetic acid, trisodium dicarboxymethyl alaninate; pentasodium diethylene-triaminepentaacetate; or trisodium N-(hydroxyethyl)-ethylenediaminetriacetate.

Aspect 13. The method as in any prior aspect, wherein the second spacer fluid comprises about 10% to about 30% of the chelating agent based on a total weight of the second spacer fluid.

Aspect 14. The method as in any prior aspect, further comprising displacing the second spacer fluid with a cement slurry.

Aspect 15. The method of as in any prior aspect, wherein the wellbore has a bottom hole temperature of about 150° F. to about 350° F.

Aspect 16. A spacer fluid system comprising: a first spacer fluid comprising barium sulfate and a first spacer fluid carrier; and a second spacer fluid comprising about 10% to about 30 wt % of a chelating agent based on a total weight of the second spacer fluid, and a second spacer fluid carrier, wherein the first spacer fluid carrier and the second spacer fluid carrier independently comprises water or a brine; and wherein the chelating agent in the second spacer fluid comprises at least one of ethylenediaminetetraacetic acid or a salt thereof, (N,N-dicarboxymethyl glutamic) acid or a salt thereof, aspartic acid N,N-diacetic acid or a salt thereof, methylglycine N,N-diacetic acid or a salt thereof, etidronic acid or a salt thereof, diethylenetriamine pentaacetate or a salt thereof, hydroxyethylethylenediaminetriacetic acid or a salt thereof; N-(2-hydroxyethyl)iminodiacetic acid or a salt thereof, ethylenediamine-N, N'-disuccinic acid or a salt thereof, egtazic acid or a salt thereof, nitrilotriacetic acid or salt thereof, or cyclohexanediaminetetraacetic acid or a salt thereof.

Aspect 17. The spacer fluid as in any prior aspect, wherein the first spacer fluid, the second spacer fluid, or both independently further comprises at least one of a viscosifier, a viscosifier crosslinker, a pH control agent, a surfactant, a weighting agent, a lubricant, a fluid loss agent, a clay stabilizer, a biocide, an acid, a corrosion inhibitor, a friction reducer, an oxygen scavenger, a formation fines controller, a foamer, or a gel stabilizer.

All ranges disclosed herein are inclusive of the endpoints, and the endpoints are independently combinable with each other. As used herein, "combination" is inclusive of blends, mixtures, alloys, reaction products, and the like.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

Unless defined otherwise, technical and scientific terms used herein have the same meaning as is commonly understood by one of skill in the art to which this invention belongs.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A method comprising
    injecting a first spacer fluid into a wellbore that comprises a drilling fluid to displace the drilling fluid with the first spacer fluid, the first spacer fluid consisting of
    barium sulfate,
    about 60 to about 98 wt % of a first spacer fluid carrier which is water or a brine, based on a total weight of the first spacer fluid, and
    optionally at least one of a viscosifier, a viscosifier crosslinker, a pH control agent, a surfactant, a weighting agent, a lubricant, a fluid loss agent, a clay stabilizer, a biocide, an acid, a corrosion inhibitor, a friction reducer, an oxygen scavenger, a formation fines controller, a foamer, or a gel stabilizer; and
    injecting into the wellbore a second spacer fluid comprising a chelating agent and a second spacer fluid carrier, wherein at least a portion of the barium sulfate from the first spacer fluid is deposited on a wall of the wellbore, an apparatus in the wellbore, or a combination thereof upon contact with the first spacer fluid, and
    the method further comprises dissolving and removing the deposited barium sulfate with the second spacer fluid.

2. The method of claim 1, further comprising displacing the drilling fluid with the second spacer fluid.

3. The method of claim 2, wherein displacing the drilling fluid further comprises displacing a contaminant particulate present in the wellbore.

4. The method of claim 3, wherein the contaminant particulate comprises at least one of a drilling fluid particulate, drilling cutting, or a reservoir rock particulate.

5. The method of claim 1, wherein the second spacer fluid carrier comprises water or a second brine.

6. The method of claim 1, wherein the second spacer fluid further comprises at least one of a second viscosifier, a second viscosifier crosslinker, a second pH control agent, a second surfactant, a second weighting agent, a second lubricant, a second fluid loss agent, a second clay stabilizer, a second biocide, a second acid, a second corrosion inhibitor, a second friction reducer, a second oxygen scavenger, a second formation fines controller, a second foamer, or a second gel stabilizer.

7. The method of claim 1, wherein the first spacer fluid has a density that is about 2 ppg higher than a density of the drilling fluid.

8. The method of claim 1, wherein the second spacer fluid has a yield point that is about 1.5 times higher than a yield point of the drilling fluid.

9. The method of claim 1, wherein the chelating agent in the second spacer fluid comprises at least one of ethylenediaminetetraacetic acid or a salt thereof, (N,N-dicarboxymethyl glutamic) acid or a salt thereof, aspartic acid N,N-diacetic acid or a salt thereof, methylglycine N,N-diacetic acid or a salt thereof, etidronic acid or a salt thereof, diethylenetriamine pentaacetate or a salt thereof, hydroxyethylethylenediaminetriacetic acid or a salt thereof, N-(2-hydroxyethyl)iminodiacetic acid or a salt thereof, ethylenediamine-N, N'-disuccinic acid or a salt thereof, egtazic acid or a salt thereof, nitrilotriacetic acid or salt thereof, or cyclohexanediaminetetraacetic acid or a salt thereof.

10. The method of claim 1, wherein the chelating agent in the second spacer fluid comprises at least one of sodium ethylenediaminetetraacetic acid, disodium ethylenediaminetetraacetic acid, diammonium ethylenediaminetetraacetic acid, or tetraammonium ethylenediaminetetraacetic acid, trisodium dicarboxymethyl alaninate; pentasodium diethylene-triaminepentaacetate; or trisodium N-(hydroxyethyl)-ethylenediaminetriacetate.

11. The method of claim 1, wherein the second spacer fluid comprises about 10% to about 30% of the chelating agent based on a total weight of the second spacer fluid.

12. The method of claim 1, further comprising displacing the second spacer fluid with a cement slurry.

13. The method of claim 1, wherein the wellbore has a bottom hole temperature of about 150° F. to about 350° F.

14. The method of claim 1, wherein the first spacer fluid is free of surfactants.

15. A method comprising
injecting a first spacer fluid into a wellbore that comprises a drilling fluid to displace the drilling fluid with the first spacer fluid,
the first spacer fluid consisting of
barium sulfate,
about 60 to about 98 wt % of a first spacer fluid carrier which is water or a brine based on a total weight of the first spacer fluid, and
optionally at least one of a viscosifier, a viscosifier crosslinker, a pH control agent, a surfactant, a weighting agent, a lubricant, a fluid loss agent, a clay stabilizer, a biocide, an acid, a corrosion inhibitor, a friction reducer, an oxygen scavenger, a formation fines controller, a foamer, or a gel stabilizer,
the first spacer fluid having a density that is about 2 ppg higher than a density of the drilling fluid,
wherein at least a portion of the barium sulfate from the first spacer fluid is deposited on a wall of the wellbore, an apparatus in the wellbore, or a combination thereof upon contact with the first spacer fluid;
injecting into the wellbore a second spacer fluid comprising
about 10 to about 30 wt % of a chelating agent based on a total weight of the second spacer fluid, and
a second spacer fluid carrier which is water or a second brine,
the second spacer fluid having a yield point that is about 1.5 times higher than a yield point of the drilling fluid,
dissolving and removing the deposited barium sulfate with the second spacer fluid, and
displacing the second spacer fluid with a cement slurry, wherein the wellbore has a bottom hole temperature of about 150° F. to about 350° F.

16. The method of claim 15, wherein the second spacer fluid consists of the chelating agent, the second spacer fluid carrier, and at least one of a second viscosifier, a second viscosifier crosslinker, a second pH control agent, a second surfactant, a second weighting agent, a second lubricant, a second fluid loss agent, a second clay stabilizer, a second biocide, a second acid, a second corrosion inhibitor, a second friction reducer, a second oxygen scavenger, a second formation fines controller, a second foamer, or a second gel stabilizer.

* * * * *